US 6,684,763 B2

(12) United States Patent
Park

(10) Patent No.: US 6,684,763 B2
(45) Date of Patent: Feb. 3, 2004

(54) METHOD AND APPARATUS FOR CRUSHING AND SORTING CANS

(76) Inventor: Chang-Geun Park, 908 Soto-Ri, Sangbuk-Myun, Yangsan-Si, Kyungsangnam-Do (KR)

( * ) Notice: Subject to any disclaimer, the term of this patent is extended or adjusted under 35 U.S.C. 154(b) by 0 days.

(21) Appl. No.: 10/283,689

(22) Filed: Oct. 30, 2002

(65) Prior Publication Data

US 2003/0079620 A1 May 1, 2003

(30) Foreign Application Priority Data

| Oct. 30, 2001 | (KR) | ................................ 2001-67235 |
| Nov. 15, 2001 | (KR) | ................................ 2001-35140 U |
| Mar. 25, 2002 | (KR) | ................................ 2002-8840 U |
| May 29, 2002 | (KR) | ................................ 2002-16460 U |

(51) Int. Cl.[7] .................................................. B30B 9/32
(52) U.S. Cl. ........................ 100/45; 100/49; 100/215; 100/902; 100/917; 209/38
(58) Field of Search .................... 100/45, 48, 49, 100/135, 215, 216, 218, 226, 240, 246, 266, 917, 902; 209/38; 221/295, 301

(56) References Cited

U.S. PATENT DOCUMENTS

| 4,436,026 A | * | 3/1984 | Imamura et al. ............... 100/45 |
| 5,524,533 A | * | 6/1996 | Koenig ......................... 100/45 |
| 2003/0057144 A1 | * | 3/2003 | Wang ........................... 209/636 |

FOREIGN PATENT DOCUMENTS

| FR | 2698028 A1 | * | 5/1994 | ............ B30B/9/32 |
| JP | 05146894 A | * | 6/1993 | ............ B30B/9/32 |
| WO | WO 00/54965 A1 | * | 9/2000 | ............ B30B/9/32 |

* cited by examiner

Primary Examiner—William Hong
Assistant Examiner—Jimmy Nguyen
(74) Attorney, Agent, or Firm—Cantor Colburn LLP

(57) ABSTRACT

A method and apparatus are provided for crushing and sorting cans to collect waste cans in an optimal weight-to-volume ratio are provided. The method includes determining whether or not an object is supplied to a can crushing device and whether or the supplied object is a can by a proximity sensor installed at a can supply unit, and when it is determined that the supplied object is a can, opening an opening/closing plate installed at the can supply unit, thereby supplying the can into a crushing/sorting/discharging unit, and crushing/sorting/discharging for crushing the supplied can by a crushing plate installed in the crushing/sorting/discharging unit, sorting the crushed can using an electromagnetic force applied to the crushing plate by electromagnets mounted on the crushing plate, in accordance with the material of the can, and then discharging the sorted can.

9 Claims, 17 Drawing Sheets

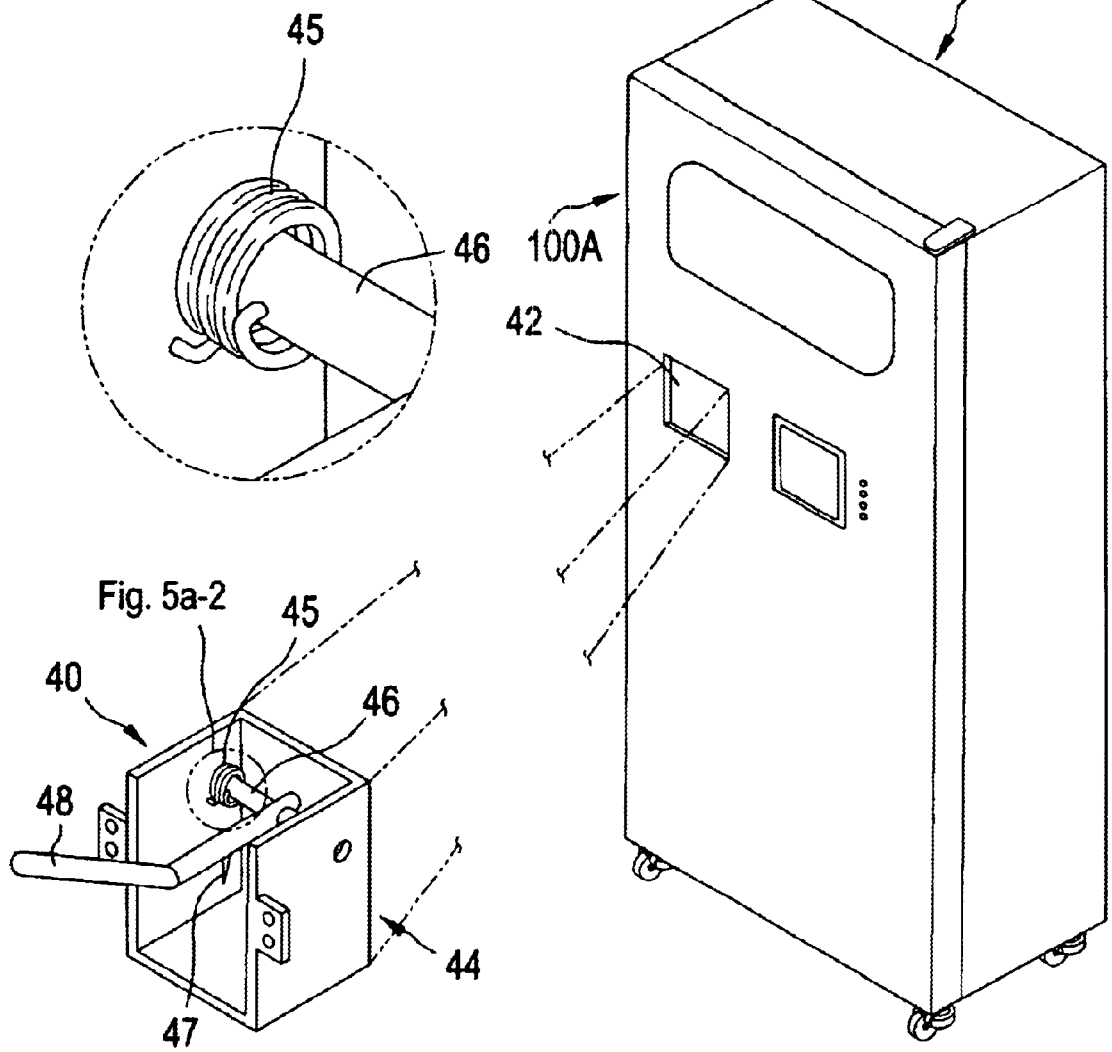

METHOD AND APPARATUS FOR CRUSHING AND SORTING CANS

BACKGROUND OF THE INVENTION

1. Field of the Invention

The present invention relates to a method and apparatus for crushing and sorting cans to collect waste cans in an optimal weight-to-volume ratio or in a minimum volume-to-weight ratio, and more particularly to a method and apparatus for crushing and sorting cans, using a simple construction and a minimum number of processing steps.

2. Description of the Related Art

Generally, cans filled with various food, for example, beverages or beer, are made of a metal material such as iron or aluminum. After being emptied, most cans are disposed of as they are. For this reason, such waste cans cause severe environmental contamination, and increased waste of resources. In order to solve such problems, various proposals have been made which are adapted to collect emptied cans.

Recently, automatic can crushing devices have been proposed which can automatically crushing emptied cans supplied thereto, and then automatically collect the crushed cans. However, such conventional can crushing devices have a complicated construction, thereby involving frequent failures. Furthermore, such devices are very expensive.

In order to solve such problems, various can crushing devices having improved constructions have been proposed by the applicant. An example of such can crushing devices is disclosed in Korean Utility Model Registration No. 137011 entitled "Can Crusher". Now, the can crusher disclosed in Korean Utility Model Registration No. 137011 will be described in brief with reference to FIG. 11 and FIGS. 12$a$ and 12$b$.

FIG. 11 is a front view illustrating an essential portion of the conventional can crusher. FIGS. 12$a$-1 and 12$a$-2 are front views schematically illustrating an operation of the can crusher shown in FIG. 11, whereas FIGS. 12$b$-1 and 12$b$-2 are side views corresponding to FIGS. 12$a$-1 and 12$a$-2.

As shown in the drawings, the conventional can crusher 1 includes: a case consisting of a door (not shown) and a case body 100; a can supply unit 120 installed on a support frame 110 included in the case body 100, and equipped with a can supply container 128 provided with an opening/closing plate 122, a limit switch 123, a proximity switch 124, and an electromagnet 126; a crushing unit 130 including a crushing container 132 having an inlet 131 for receiving cans supplied from the can supply unit 120, and a fixed plate mounted to one end of the crushing container 132, while including, within the crushing container 132, a hydraulic pump, a hydraulic motor and a cylinder 135 having a rod 135 carrying a crushing plate 136; a guide/discharge unit 140 arranged beneath the crushing unit, and equipped with a sorting plate 144 driven by a control motor 142; and collecting containers 150 arranged beneath the guide/discharge unit.

Each unit of the can crusher is controlled in a well-known fashion by a control box installed at the upper portion of the can crusher. A can supply plate is mounted to the door where the inlet is arranged. The can supply plate is hingable in a well known fashion.

In the conventional can crusher 1 having the above described configuration, when a can is supplied into the can supply unit, it is determined by the proximity sensor whether or not foreign matters are introduced along with the can. It is then determined, using the electromagnet, whether the supplied can is an iron can or an aluminum can. Thereafter, the sorting plate arranged at the guide/discharge unit moves to a collecting container selected based on the determined result. At the same time, the opening/closing plate is opened, thereby allowing the supplied can to be introduced into the crushing container of the crushing unit.

The can introduced in the crushing container is crushed between the fixed plate and the crushing plate mounted to the rod of the cylinder as the cylinder operates, and then discharged into a selected one of the collecting containers via the guide/discharge unit. Thus, cans supplied into the can crusher are crushed and sorted in accordance with the materials of those cans. Accordingly, convenience is provided in accordance with the sorted collection of waste cans.

However, the above mentioned conventional can crusher has a problem in that a lot of time is taken for one can to be discharged after being crushed and sorted because the can crusher has a complicated construction, and its crushing process involves a number of processing steps.

SUMMARY OF THE INVENTION

Therefore, the present invention provides a method and apparatus for crushing and sorting cans, having a simple construction and a minimum number of processing steps.

The invention provides a can crushing and sorting apparatus configured to drive its crushing plate in a gear-driven fashion using a gear operatively connected to a DC motor, thereby greatly reducing the manufacturing costs while considerably reducing the weight of the apparatus, so that the apparatus has a lightest possible construction.

The invention provides a method and apparatus for crushing and sorting cans which can simply, easily and conveniently punch cans containing flammable or explosive gas, thereby improving safety during crushing and sorting operations.

The invention provides a can crushing and sorting apparatus configured to easily achieve the replacement of a punching pin while allowing a user to easily use a punching lever.

The invention provides a method and apparatus for crushing and sorting cans which can not only easily achieve the crushing, sorting and collecting processes for cans, but also the simple and convenient collecting of waste paper cups by stacking those cups, and then crushing of the cups.

The invention provides a method and apparatus for crushing and sorting cans which can simply and conveniently collect waste paper cups by stacking those cups, and then crushing the cups, while being capable of conveniently identifying the amount of the stacked cups.

The invention provides a method and apparatus for crushing and sorting cans which can simply and conveniently collect waste paper cups by stacking those cups, and then crushing the cups, while being capable of preventing the residual liquid contents of the cups from leaking externally.

The invention provides a method and apparatus for crushing and sorting cans which can collect waste paper cups more efficiently.

In accordance with one aspect, the present invention provides a method for crushing and sorting cans by use of a can crushing device into which the cans are sequentially supplied, comprising: an object determining step for determining whether or not an object is supplied, and then whether or not the supplied object is a can or a foreign matter; a can supplying step for if it is determined that the supplied object is a can, supplying the can into the can crushing device; and a can crushing/sorting/discharging step for crushing the supplied can by a crushing plate installed in the can crushing device, sorting the crushed can using an electromagnetic force applied to the crushing plate in accordance with the material of the can, and then discharging the sorted can.

In accordance with another aspect, the present invention provides a can crushing and sorting apparatus including a case consisting of a door and a case body, a can supply unit installed on a support frame included in the case body, and equipped with a can supply container provided with an opening/closing plate driven to be opened and closed by a drive motor, and a proximity switch mounted to a lower surface of the can supply container, a crushing and sorting unit for crushing and sorting cans supplied from the can supply unit, collecting containers arranged beneath the crushing and sorting unit, and a control unit for controlling each unit of the apparatus, wherein the crushing and sorting unit comprises: a frame fixedly mounted to the support frame for the can supply unit, and adapted to define a crushing chamber, the frame being opened at its top and bottom; a driving unit supported by the frame, and equipped with a hydraulic pump, a hydraulic motor, and a cylinder having a rod extending through the frame; and a crushing/sorting/discharging unit including sensors respectively mounted to an upper end of the frame at opposite lateral ends of the frame, a vertically-extending crushing plate mounted to a protruded end of the rod within an interior of the frame, and attached with electromagnets, and a support plate extending horizontally from a lower end of the crushing plate to be integral with the crushing plate, the support plate having a discharge hole while being arranged to be orthogonal to the crushing plate.

Preferably, the discharge hole of the support plate has a desired width to allow the crushed can to be discharged downwardly from a region where the support plate adjoins the crushing plate while being orthogonal to the crushing plate.

Preferably, the driving unit comprises a guide rail arranged at one side of the frame, and connected to a shaft extending through the frame to be coupled to the crushing plate, a rack slidably mounted on the guide rail outside the frame, and a pinion coupled to a DC motor, and engaged with the rack to slide along the guide rail in accordance with a rotation thereof carried out by the DC motor.

The can crushing and sorting apparatus may further comprise a punching unit including a punching box fitted in a fitting opening formed at an upper portion of the door near one side of the door while being fixedly mounted to the door, a shaft rotatably mounted at both ends thereof to opposite side walls of the punching box, respectively, a torsion spring coupled at one end thereof to one side wall of the punching box and at the other end thereof to the shaft, and a punching lever mounted at one end thereof to the shaft, and provided with a downwardly-extending punching pin.

The punching lever may be provided with a threaded hole for allowing the punching pin to be threadedly coupled to the punching lever, while having a foldable structure having two lever portions pivotably coupled to each other, and a support member integrally formed with one of the lever portions, and adapted to support the other lever portion.

The can crushing and sorting apparatus may further comprise a plurality of cup receiving holes formed at a lower portion of the door; and a paper cup collecting unit including guide members mounted to a back surface of the door to communicate with respective cup receiving holes, and adapted to downwardly guide paper cups introduced into the cup receive holes, and paper cup stackers mounted to the back surface of the door, and connected to respective guide members, in order to stack the paper cups introduced into the cup receiving holes. Each paper cup stacker may include a support plate adapted to support the paper cups introduced along an associated one of the guide members in a stacked state, and a guide plate arranged between the support plate and the associated guide member while being detachably mounted to the support plate and the associated guide member, in order to guide the introduced paper cups, thereby stably stacking the paper cups on the support plate.

The can crushing and sorting apparatus may further comprise a stacked cup amount display unit having viewing slots each formed at the door, and adapted to allow a user to view the amount of paper cups stacked in an associated one of the paper cup stackers.

The support plate may be provided with a downwardly-formed recess.

Meanwhile, each paper cup stacker may include a support ring, a plurality of guide rods fixed at upper ends thereof to the support ring while being uniformly spaced apart from one another in a circumferential direction, and a cup receiving member mounted to lower ends of the guide rods, and adapted to receive paper cups to be stacked, so that the paper cup stacker is detachably coupled to an associated one of the guide members.

BRIEF DESCRIPTION OF THE DRAWINGS

The above objects, and other features and advantages of the present invention will become more apparent after a reading of the following detailed description when taken in conjunction with the drawings, in which:

FIG. 3b is a partially-broken front view corresponding to FIG. 3a;

FIGS. 5a-1 through 5a-3 are schematic perspective views illustrating a can crushing and sorting apparatus according to another embodiment of the present invention in which a punching unit is installed;

FIG. 5b is a sectional view illustrating the operation of the punching unit shown in FIG. 5a;

FIG. 7b is an exploded perspective view illustrating the inner configuration of the apparatus shown in FIG. 7a;

FIG. 7c is a schematic view illustrating the use of the can crushing and sorting apparatus shown in FIG. 7a;

FIGS. 9a and 9b illustrate a paper cup collecting unit according to another embodiment of the present invention in the can crushing and sorting apparatus of FIG. 7a;

FIG. 10 is a perspective view illustrating a paper cup collecting unit according to another embodiment of the present invention in the can crushing and sorting apparatus of FIG. 7a;

FIGS. 12a-1 and 12a-2 schematically illustrate an operation of the can crusher shown in FIG. 11; and FIGS. 12b-1 and 12b-2 are side views corresponding to FIGS. 12a-1 and 12a-2.

DESCRIPTION OF PREFERRED EMBODIMENTS

Now, preferred embodiments of the present invention will be described in detail with reference to the annexed drawings.

Figure 1:
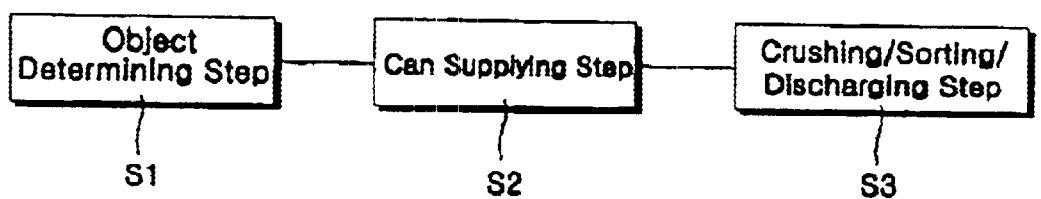
FIG. 1 is a block diagram illustrating sequential processing steps of a can crushing and sorting method according to the present invention.

FIG. 1 is a block diagram illustrating sequential processing steps of a can crushing and sorting method according to the present invention.

In accordance with this can crushing and sorting method, emptied cans are crushed and sorted using a can crushing device to which those cans are supplied. As shown in FIG. 1, the can crushing and sorting method according to the present invention involves an object determining step S1 for determining whether or not an object is supplied, and then whether or not the supplied object is a can or a foreign matter; a can supplying step S2 for if it is determined that the supplied object is a can, supplying the can into the can crushing device; and a can crushing/sorting/discharging step S3 for crushing the supplied can by a crushing plate installed in the can crushing device, sorting the crushed can using an electromagnetic force applied to the crushing plate in accordance with the material of the can, and then discharging the sorted can.

Figure 2:
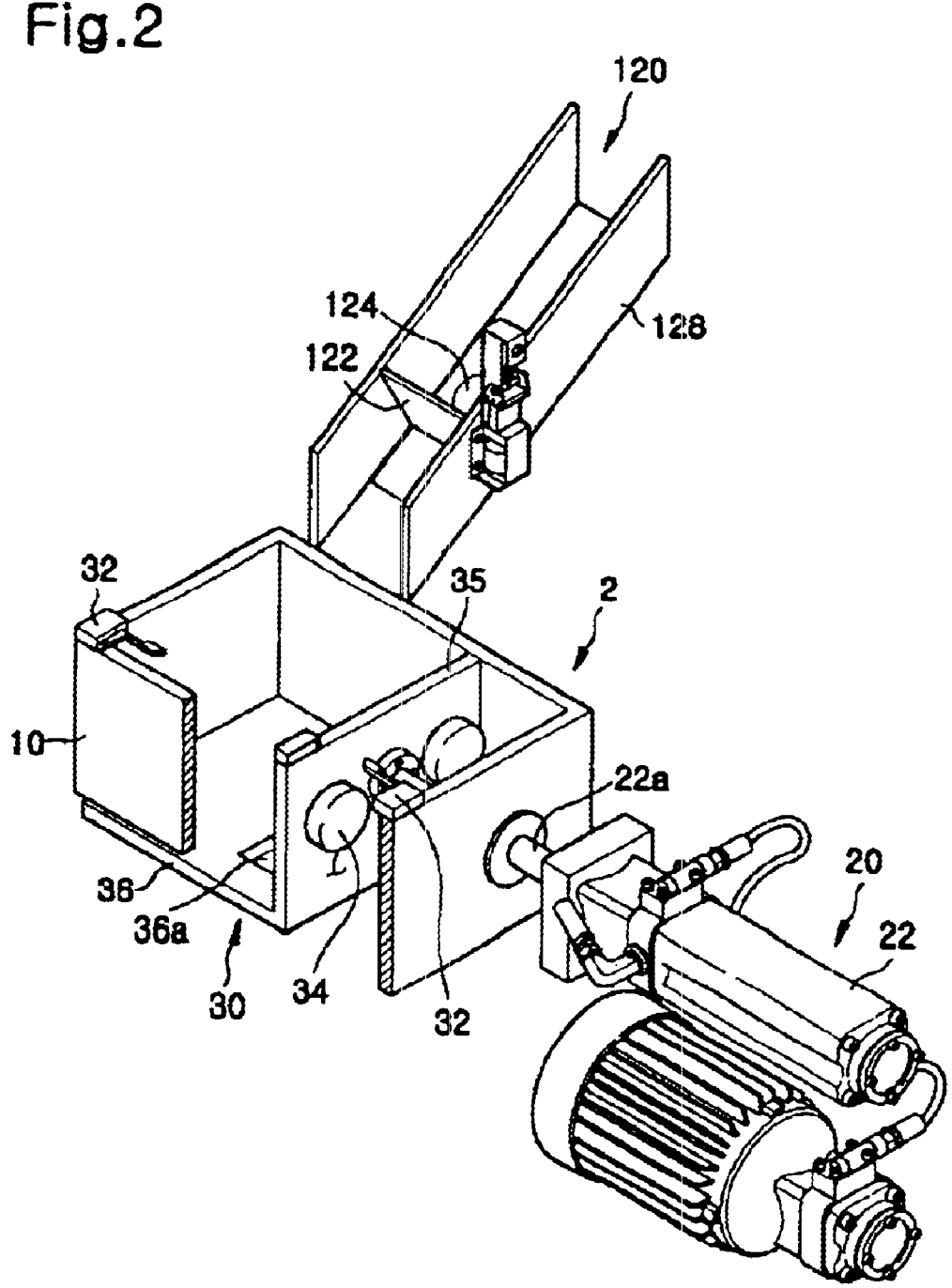
FIG. 2 is a perspective view illustrating a can crushing and sorting apparatus according to the present invention.
Figure 11:
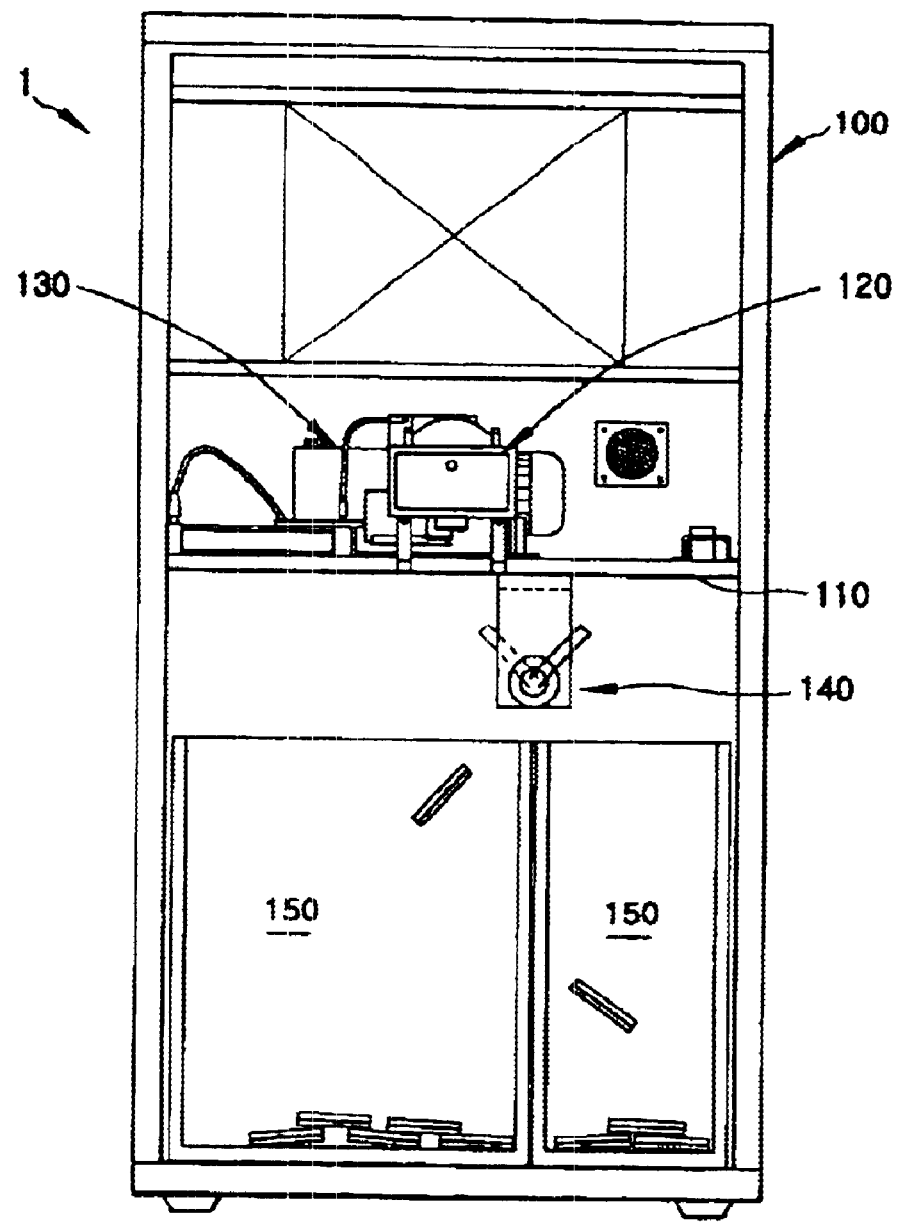
FIG. 11 is a front view illustrating an essential portion of a conventional can crusher.
Figures 1, 12A:
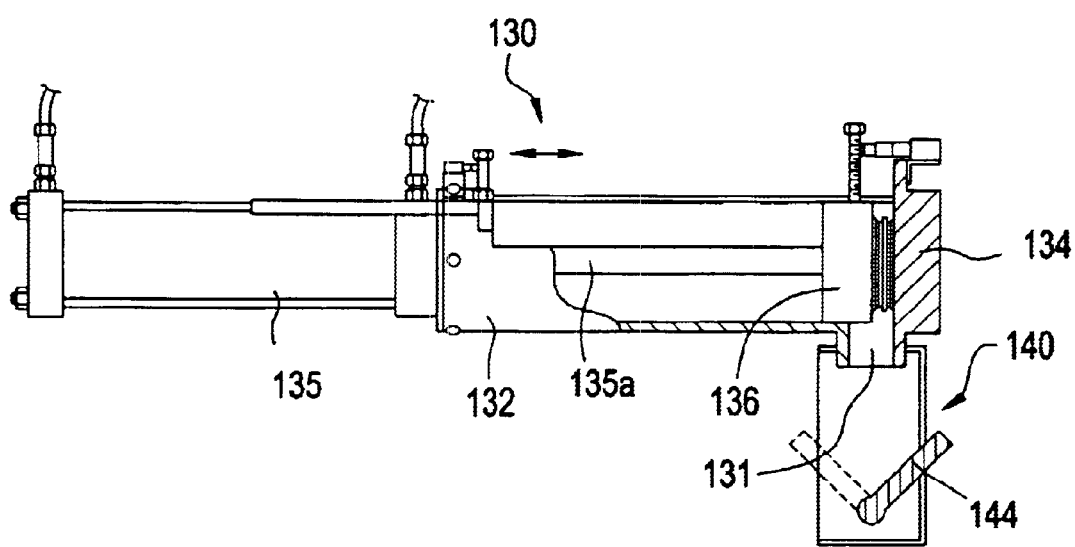
Figures 2, 12A:
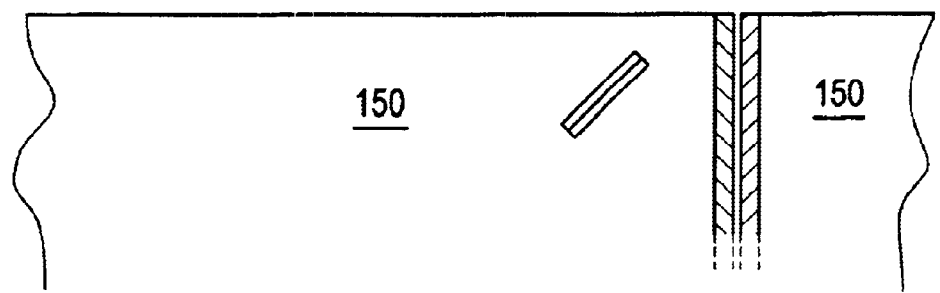
Figures 1, 12B:
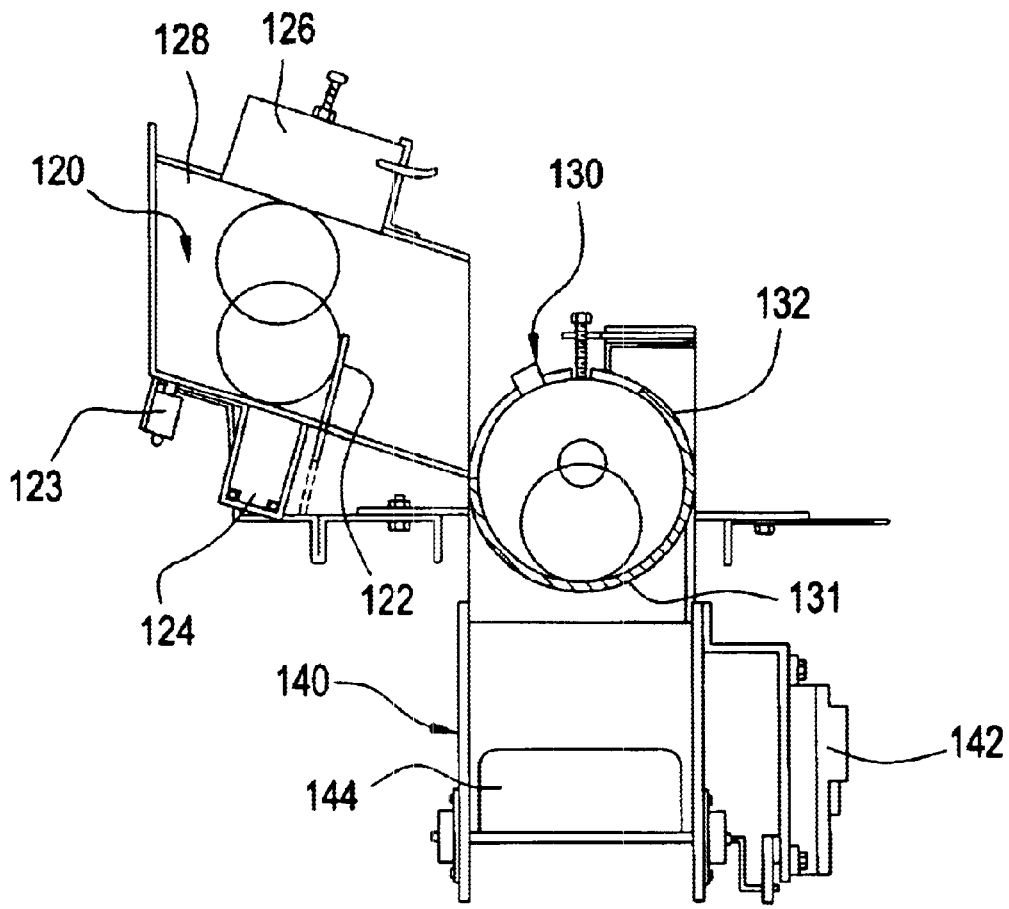
Figures 2, 12B:
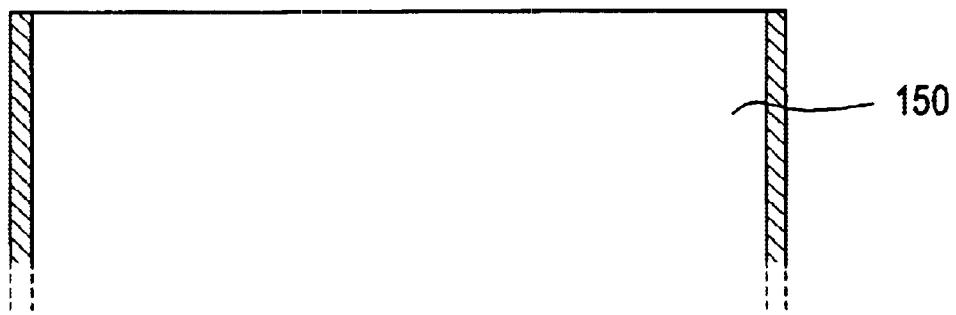

FIG. 2 is a perspective view illustrating a can crushing and sorting apparatus according to the present invention. In FIG. 2, elements respectively corresponding to those in FIGS. 11, 12a, and 12b are denoted by the same reference numerals.

As shown in FIG. 2, the can crushing and sorting apparatus includes a case consisting of a door and a case body, a can supply unit 120 installed on a support frame included in the case body, and equipped with a can supply container 128 provided with an opening/closing plate 122 driven to be opened and closed by a drive motor, and a proximity switch 124 mounted to a lower surface of the can supply container 128, a crushing and sorting unit 2 for crushing and sorting cans supplied from the can supply unit 120, collecting containers arranged beneath the crushing and sorting unit, and a control unit for controlling each unit of the apparatus. This configuration is similar to that of the above mentioned conventional apparatus.

In accordance with the present invention, the crushing and sorting unit 2 includes a frame 10 fixedly mounted to the support frame for the can supply unit 120 by means of a bracket and a general fixing method using screws or welding, and adapted to define a crushing chamber, and a driving unit 20 supported by the frame 10, and equipped with a general hydraulic pump, a general hydraulic motor, and a cylinder 22. The frame 10 is vertically opened to have opened top and bottom portions. The cylinder 22 has a rod 22a extending through the frame 10. The crushing and sorting unit 2 further includes a crushing/sorting/discharging unit 30. This crushing/sorting/discharging unit 30 includes sensors 32 respectively mounted to the upper end of the frame 10 at opposite lateral ends of the frame 10. Each sensor 32 may be a limit switch. The crushing/sorting/discharging unit 30 also includes a vertically-extending crushing plate 35 mounted to a protruded end of the rod 22a, and attached with electromagnets 34, and a support plate 36 extending horizontally from a lower end of the crushing plate 35 to be integral with the crushing plate 35, and having a discharge hole 36a. The support plate 36 is arranged to be orthogonal to the crushing plate 35. The support plate 36 normally closes the bottom of the frame 10. The discharge hole 36a of the support plate 36 has a desired width to allow the crushed can to be discharged downwardly from the region where the support plate 36 adjoins the crushing plate 35 while being orthogonal to the crushing plate 35.

Figure 3A:
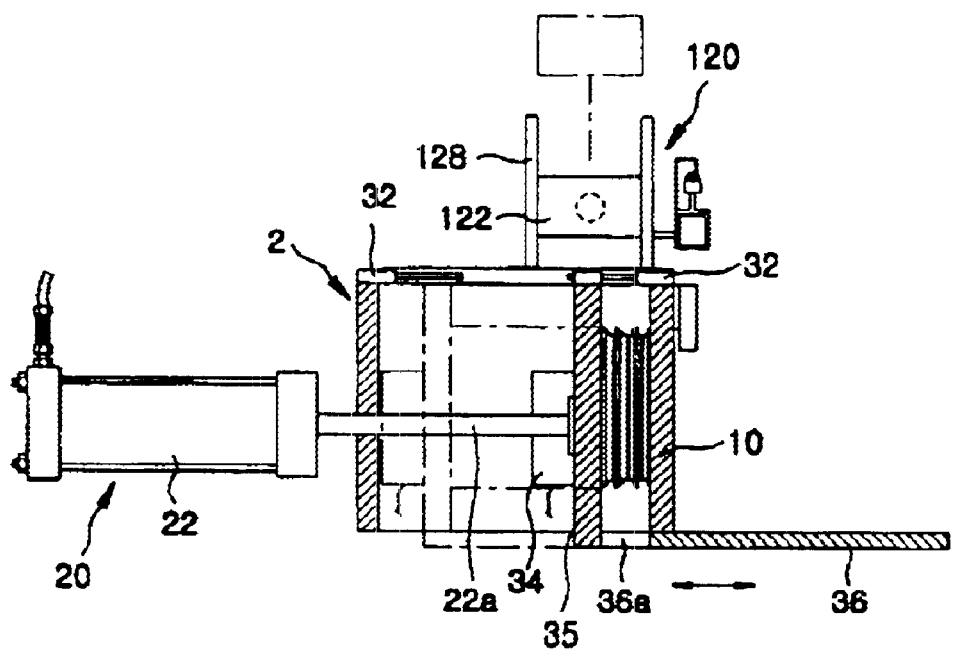
FIG. 3a is a side view schematically illustrating the operation of the can crushing and sorting apparatus according to the present invention.
Figure 3B:
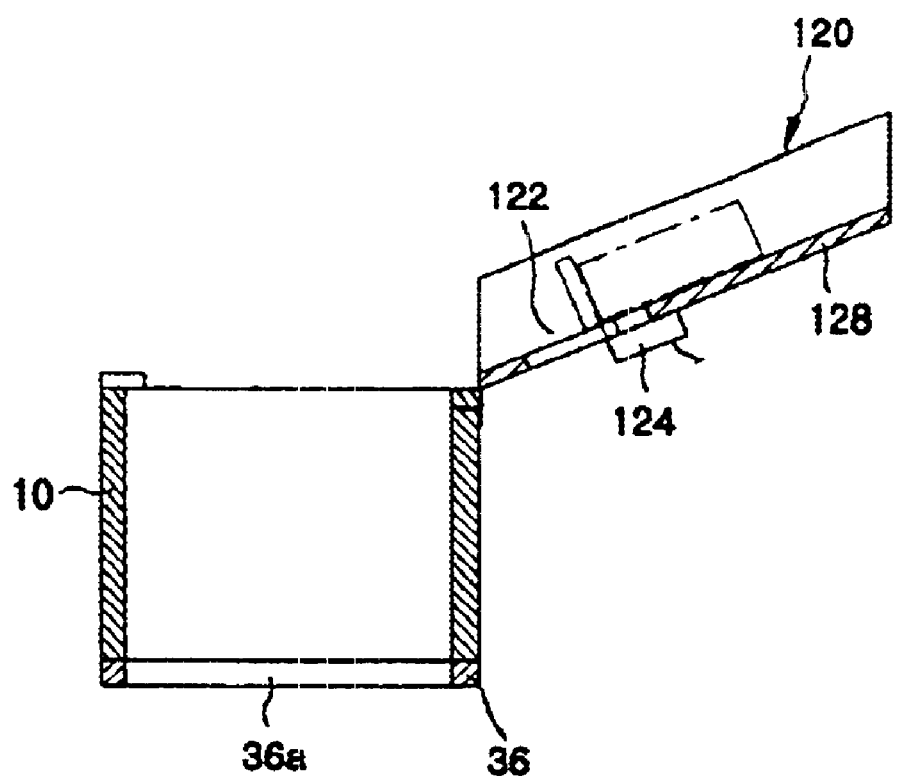

FIG. 3a is a side view schematically illustrating the operation of the can crushing and sorting apparatus having the above described configuration according to the present invention. FIG. 3b is a partially-broken front view corresponding to FIG. 3a.

As shown in FIGS. 3a and 3b, when an object is supplied into the can supply unit 120, it is determined, by the proximity sensor 124 arranged at the bottom of the can supply container 128, whether the supplied object is a can or a foreign matter. When it is determined that the supplied object is a can, the opening/closing plate 122 is opened by the drive motor, thereby causing the can to be supplied into the interior of the frame 10. At this time, the bottom of the frame 10 is in a state of being closed by the support plate 36 extending from the lower end of the crushing plate 35 in a direction orthogonal to the crushing plate 35, as indicated by the dotted line in FIG. 3a. Accordingly, the can supplied into the frame 10 is held in a state of being laid on the support plate 36 in the crushing chamber.

When the can is introduced into the interior of the frame 10, the driving unit 20 operates to extend the rod 22 of the cylinder 22, thereby causing the crushing plate 35 and support plate 36 to move toward a wall of the frame 10 facing the crushing plate 35. As a result, the can is crushed by the crushing plate 35 between the crushing plate 35 and the facing frame wall. At this time, the movement of the crushing plate 35 is sensed by a first one of the sensors 32 arranged near the cylinder 22. That is, when the crushing plate 35 moves in a crushing direction, the first sensor 32 contacting the crushing plate 35 is separated from the crushing plate 35, so that it generates a sensing signal causing the electromagnet 34 to be activated. As the electromagnet 34 is activated, the crushing plate has a magnetic force.

When the crushing operation is completed, that is, the crushing plate 35 comes into contact with a second one of the sensors 32, the cylinder 22 is operated to retract its rod 22a. At this time, where the crushed can is made of aluminum, it is not maintained in a state of being attached to the crushing plate 35 even through the crushing plate 35 has the magnetic force. As a result, the crushed can is discharged into one collecting container 150 through the discharge hole 36a of the support plate 36 integral with the crushing plate 35.

On the other hand, where the crushed can is made of iron, it is maintained in a state of being attached to the crushing plate 35 by virtue of the magnetic force exerted on the crushing plate 35. Accordingly, the crushed can is moved along with the crushing plate 35 when the rod 22a is retracted. When the crushing plate 35 comes into contact with the first sensor 32 again, the electromagnetic 34 is inactivated, thereby causing the iron can to be detached from the crushing plate 35. As a result, the iron can is discharged into the other collecting container 150 through the discharge hole 36*a* of the support plate 36. In this state, the can crushing and sorting apparatus is positioned again at its initial position.

Thus, it is possible to obtain conditions capable of considerably reducing the time taken for the can to be crushed, sorted, and then discharged, using a more simple can crushing construction.

Figure 4:
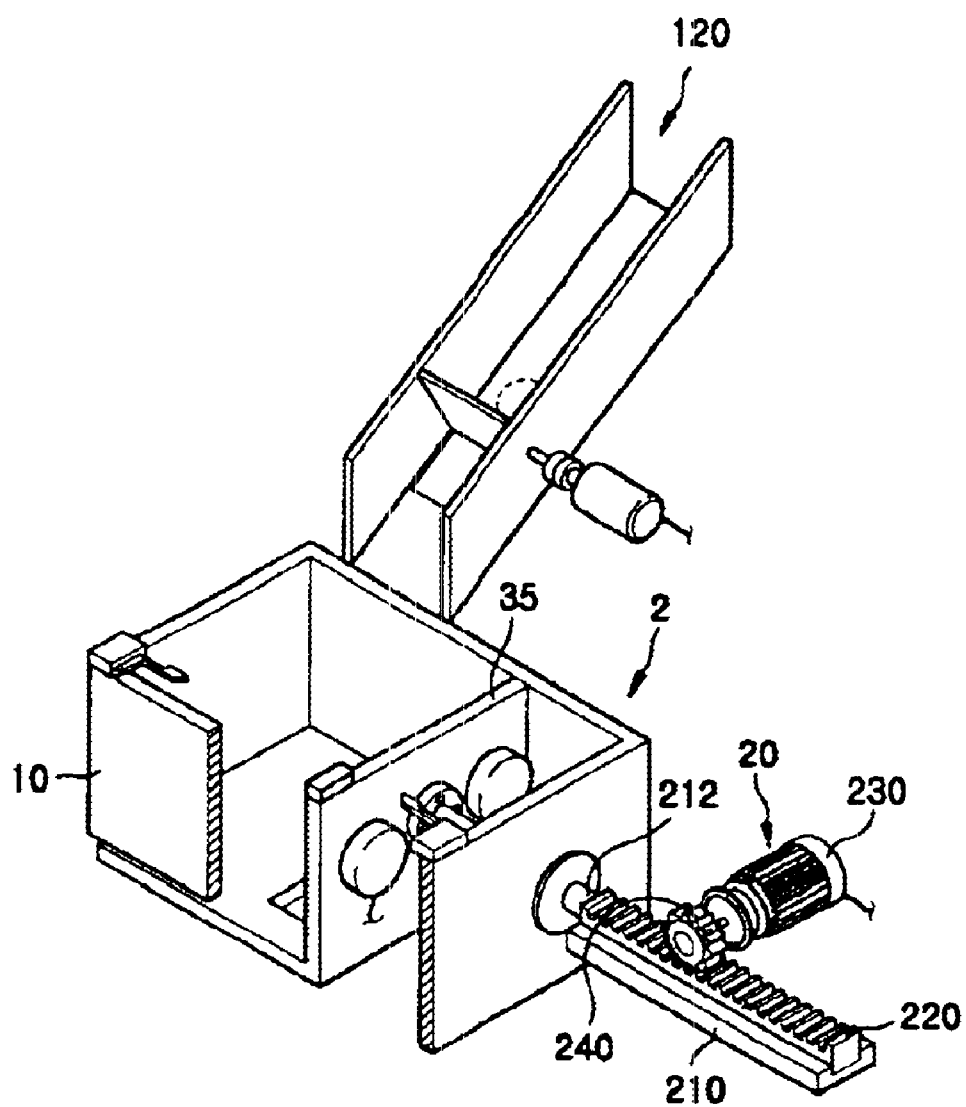
FIG. 4 is a perspective view illustrating a driving unit according to another embodiment of the present invention.

FIG. 4 is a perspective view illustrating a driving unit according to another embodiment of the present invention.

As shown in FIG. 4, in accordance with this embodiment, the driving unit 20 includes a rack 220 slidably mounted on a guide rail 210. The guide rail 210 is arranged at one side of the frame 10, and connected to a shaft 212 extending through the frame 10 to be coupled to the crushing plate 35. The driving unit 20 also includes a pinion 240 mounted to a DC motor 230, and engaged with the rack 220 to slide along the guide rail 210 in accordance with a rotation thereof.

In accordance with this configuration, the crushing plate 35 is reciprocated as the rack 220 is reciprocated along the guide rail 210 in accordance with rotation of the pinion 240 carried out by the operation of the DC motor 230, so that the can introduced into the interior of the frame 10 can be crushed, and then discharged.

Meanwhile, although the opening/closing plate 122 has been described as being operated by the drive motor included in the can supply unit 120, it may be directly operated by a small-size DC motor in order to reduce the manufacturing costs.

Thus, it is possible to provide an inexpensive can crushing and sorting apparatus by replacing the conventional expensive hydraulic driving system with a gear type driving system using a DC motor, thereby reducing the manufacturing costs.

Since the gear type driving system is considerably light, as compared to the hydraulic driving system, it is possible to provide a lighter can crushing and sorting apparatus.

FIGS. 5*a*-1 through 5*a*-3 are schematic perspective views illustrating a can crushing and sorting apparatus according to another embodiment of the present invention in which a punching unit is installed.

In accordance with this embodiment, as shown in FIG. 5*a*, the can crushing and sorting apparatus further includes a punching unit 40 mounted to the door denoted by the reference numeral 100A in FIG. 5*a*. The punching unit 40 includes a punching box 44 fitted in a fitting opening 42 formed at an upper portion of the door 100A near one side of the door 100A, and mounted to the door 100A by means of flanges provided at the punching box 44, and screws, a shaft 46 rotatably mounted at both ends thereof to opposite side walls of the punching box 44, respectively, a torsion spring 45 coupled at one end thereof to one side wall of the punching box 44 and at the other end thereof to the shaft 46, and a punching lever 48 mounted at one end thereof to the shaft 46, and provided with a downwardly-extending punching pin 47. The punching lever 48 is pivotable about the shaft 46 between upper and lower positions, and always urged toward its upper position by the spring force of the torsion spring 45.

Figure 5B:
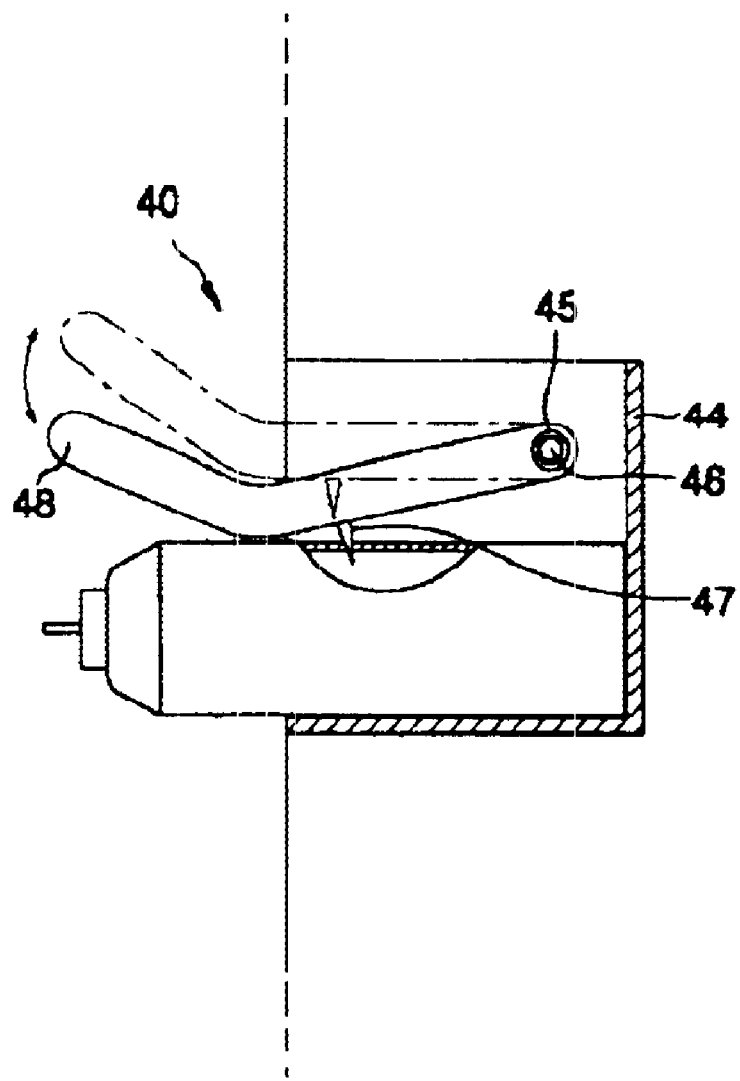

FIG. 5*b* is a sectional view illustrating the operation of the punching unit shown in FIG. 5*a*.

In accordance with the configuration shown in FIGS. 5*a* and 5*b*, it is possible to conveniently punch cans or containers containing a dangerous material such as flammable or explosive gas because the punching unit 40 is provided at the upper portion of the door 100A near one side of the door 100A. That is, when a can is desired to be punched, it is first inserted into the punching box 44. Thereafter, the user downwardly presses the punching lever 48 against the spring force of the torsion spring 45, thereby causing the punching lever 48 to be pivotably moved about the shaft 46 from its upper position indicated by the dotted line in FIG. 5*b* to its lower position indicated by the solid line in FIG. 5*b*. As a result, the can is punched by the punching pin 47 of the punching lever 48.

When the can is completely punched, the user lifts the punching lever 48 to separate the punching pin 47 from the can. When the punching pin 47 is separated from the can, the punching lever 48 is automatically upwardly pivoted about the shaft 46 by virtue of the spring force of the torsion spring 45.

Thus, cans containing flammable or explosive gas can be safely crushed and sorted by carrying out the crushing and sorting operations for those cans after simply punching the cans.

Figure 6:
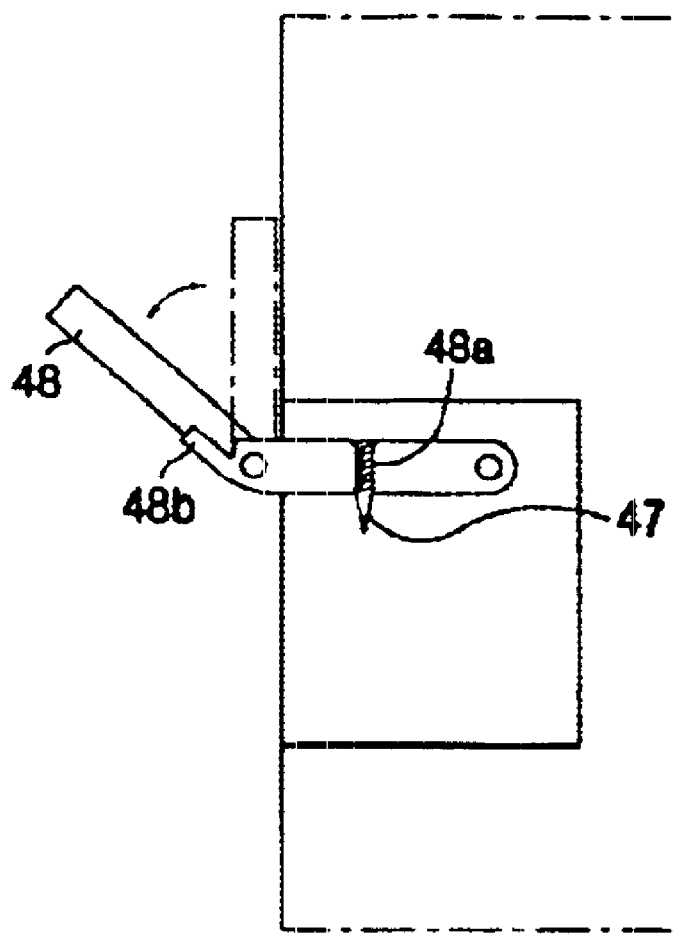
FIG. 6 is a sectional view illustrating a punching unit according to another embodiment of the present invention.

FIG. 6 is a sectional view illustrating a punching unit according to another embodiment of the present invention.

In accordance with this embodiment, as shown in FIG. 6, a threaded hole 48*a* is formed at the punching lever 48 in order to allow the punching pin 47 to be threadedly coupled to the punching lever 48. In this case, the punching pin 47 has a threaded portion adapted to be threadedly coupled to the threaded hole 48*a*. In accordance with this configuration, the punching pin 47 is replaceable with a new one when it is excessively abraded in accordance with repeated punching operations.

In accordance with this embodiment, the punching lever 48 also has a foldable structure having two lever portions pivotably coupled to each other, in order to allow an outer one of the lever portions to be pivotably moved to an upright position indicated by the dotted line in FIG. 6, thereby preventing the punching lever 48 from serving as an obstacle when it is not used. In this case, a support member 48*b* is integrally formed with the inner lever portion of the punching lever 48 in order to support the outer lever portion during the use of the punching lever 48.

In accordance with this configuration, it is possible to easily replace the punching pin abraded due to repeated punching operations with a new one. Also, it is possible to prevent the punching lever from serving as an obstacle when it is not used by bringing the outer lever portion of the punching lever into contact with the surface of the door.

Although not shown in the drawings, a groove may be formed at the door in order to receive the outer lever portion of the foldable punching lever when the outer lever portion is folded. In this case, it is possible to obtain a beautiful appearance of the can crushing and sorting apparatus.

Figure 7A:
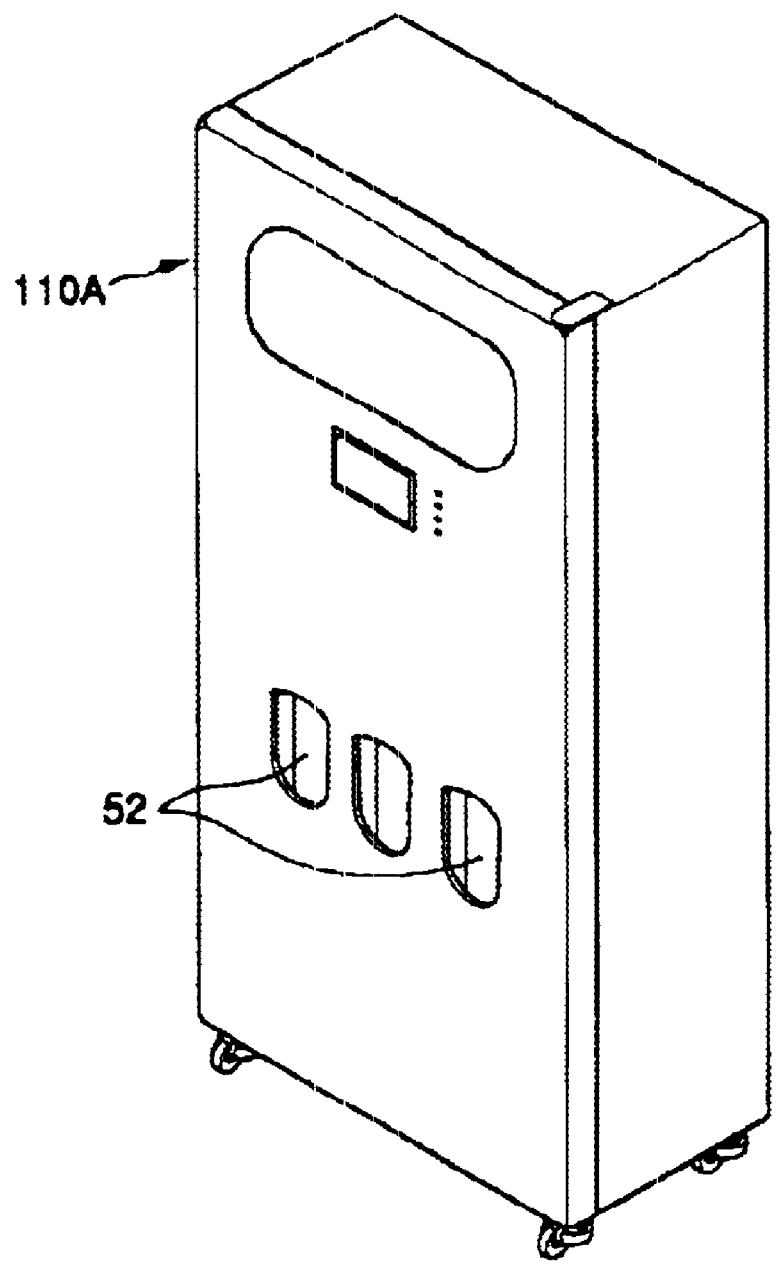
FIG. 7a is a perspective view illustrating a can crushing and sorting apparatus according to another embodiment of the present invention.
Figure 7B:
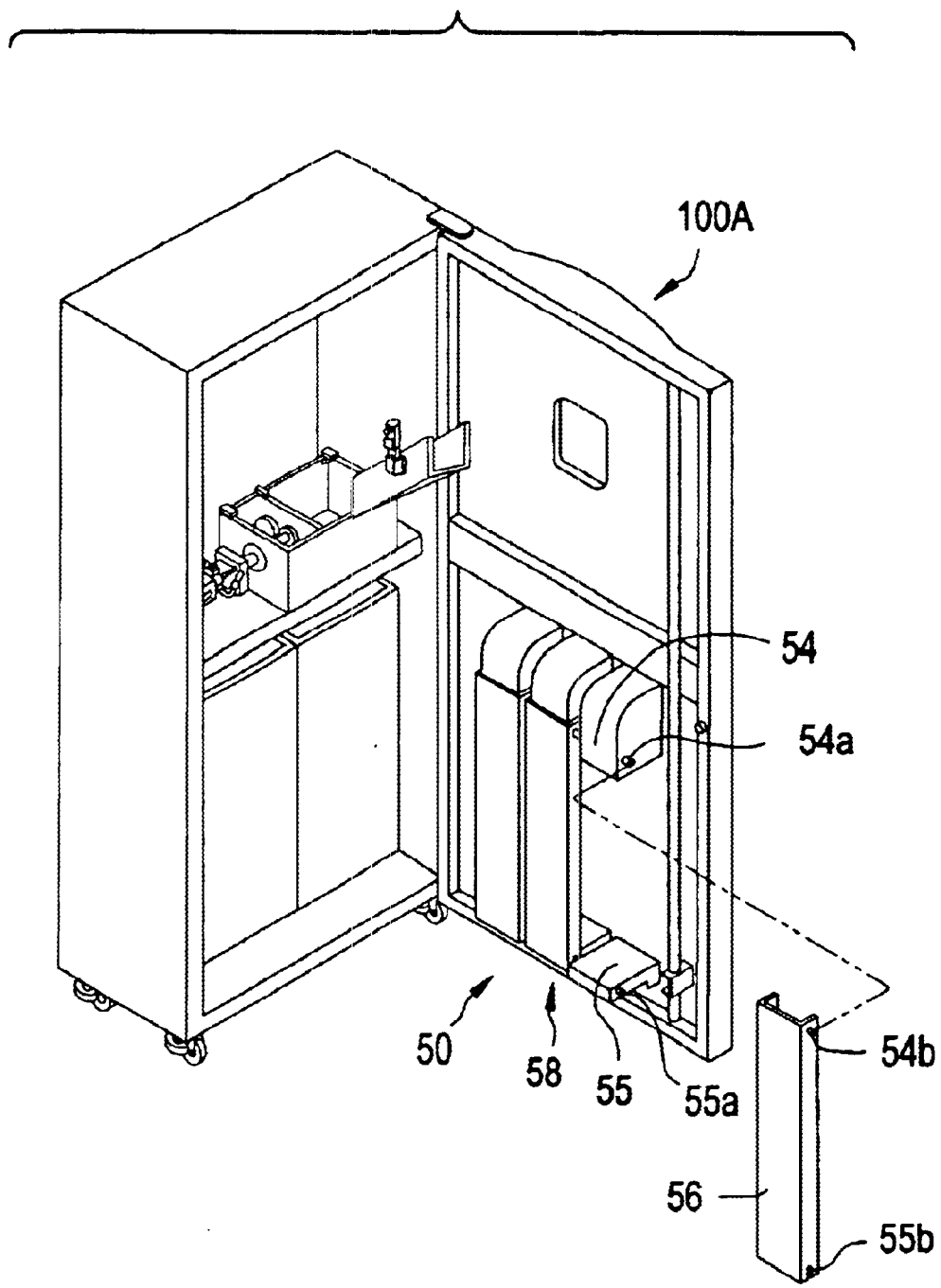

FIG. 7*a* is a perspective view illustrating a can crushing and sorting apparatus according to another embodiment of the present invention. FIG. 7*b* is an exploded perspective view illustrating the inner configuration of the apparatus shown in FIG. 7*a*.

This embodiment is adapted to not only crush and sort emptied cans, but also conveniently collect waste paper cups produced in association with the use of automatic dispensers for coffee or other beverages, which have come into wide use.

In accordance with this embodiment, the can crushing and sorting apparatus further includes a paper cup collecting unit 50, and a plurality of cup receiving holes 52 formed at the lower portion of the door 100A, and adapted to supply waste paper cups introduced therein to the paper cup collecting unit 50. The paper cup collecting unit 50 includes guide members 54 mounted to the back surface of the door 100A to communicate with respective cup receiving holes 52, and adapted to downwardly guide waste paper cups introduced into the cup receive holes 52, and paper cup stackers 58 mounted to the back surface of the door 100A, and connected to respective guide members 54, in order to stack waste paper cups introduced into the cup receiving holes 52. The mounting of each guide member 54 to the door 100A may be achieved using a well-known welding process. Each paper cup stacker 58 includes a support plate 55 adapted to support the paper cups introduced along the guide member 54 in a stacked state, and a guide plate 56 for guiding the introduced paper cups in order to stably stack the paper cups on the support plate 55. The guide plate 56 is arranged between the guide member 54 and the support plate 55 while being detachably mounted to the guide member 54 and the support plate 55 by means of engagement protrusions 54a and 55a, and engagement grooves 54b and 55b.

Figure 7C:
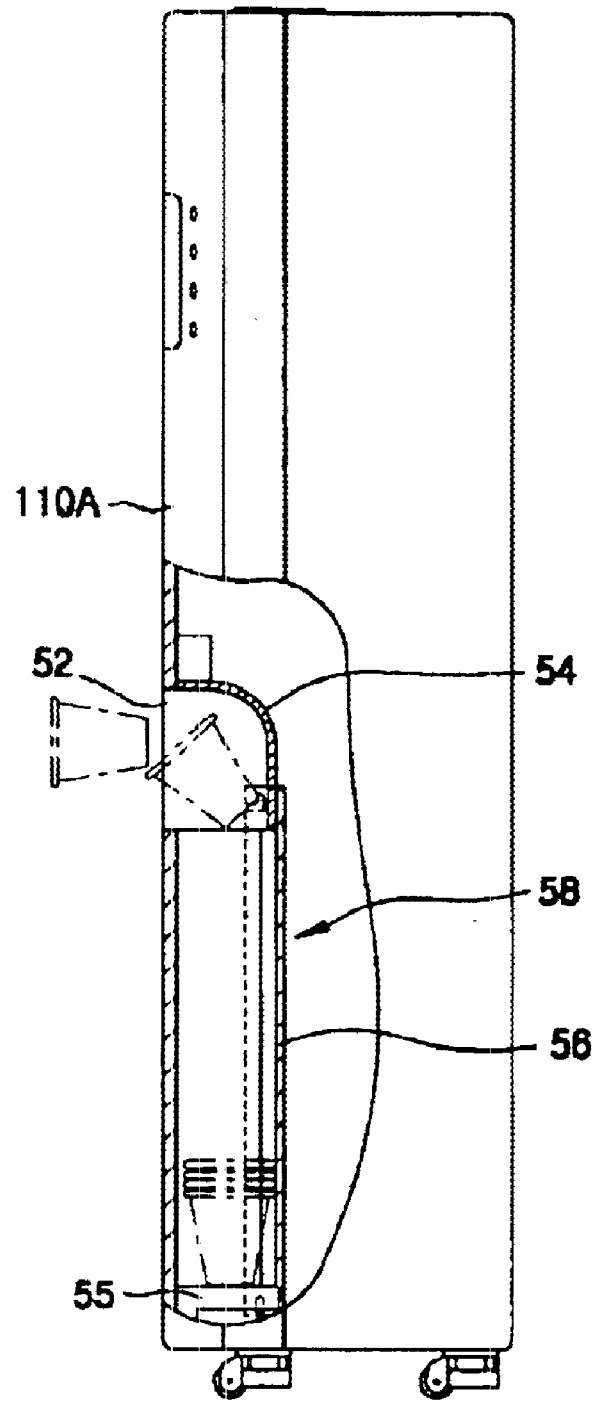

FIG. 7c is a schematic view illustrating the use of the can crushing and sorting apparatus shown in FIG. 7a.

As shown in FIG. 7c, when a waste paper cup is introduced into one of the cup receiving holes 52 formed at the door 100A, it is downwardly guided by the guide member 54 of the paper cup stacker 58 communicating with the cup receiving hole 52 at the back surface of the door 100A, and then stacked on the support plate 55 via the guide plate 56.

When a desired amount of waste paper cups are stacked on the support plate 55, the guide plate 56 detachably mounted between the guide member 54 and the support plate 55 is separated from the guide member 54 and the support plate 55, in order to remove the stacked paper cups from the paper cup stacker 58. Thus, there is an added convenience in that it is possible to collect a desired amount of waste paper cups at one time.

As apparent from the above description, in accordance with this embodiment, it is possible to not only crush and sort emptied cans, but also conveniently collect waste paper cups produced in a large amount due to the wide use of paper cups.

Figure 8:
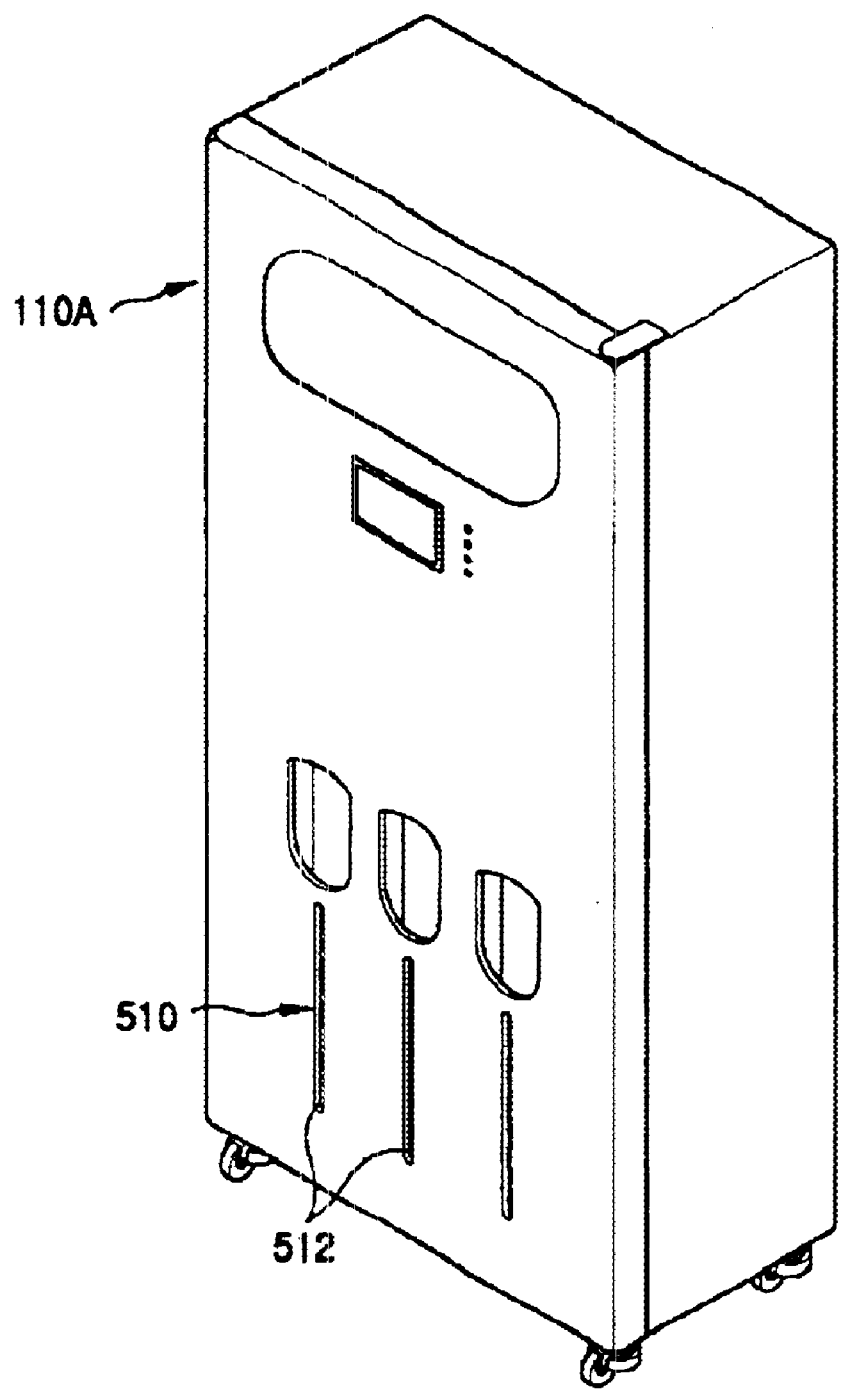
FIG. 8 is a perspective view illustrating a can crushing and sorting apparatus according to another embodiment of the present invention.

FIG. 8 is a perspective view illustrating a can crushing and sorting apparatus according to another embodiment of the present invention.

In accordance with this embodiment, as shown in FIG. 8, the can crushing and sorting apparatus further includes a stacked cup amount display unit 510 having viewing slots 512 each formed at the door 100A, and adapted to allow the user to view the amount of paper cups stacked in an associated one of the paper cup stackers.

Accordingly, the best time for collection of stacked paper cups can be conveniently determined because it is possible to conveniently check the amount of paper cups stacked in each paper cup stacker.

Figure 9A:
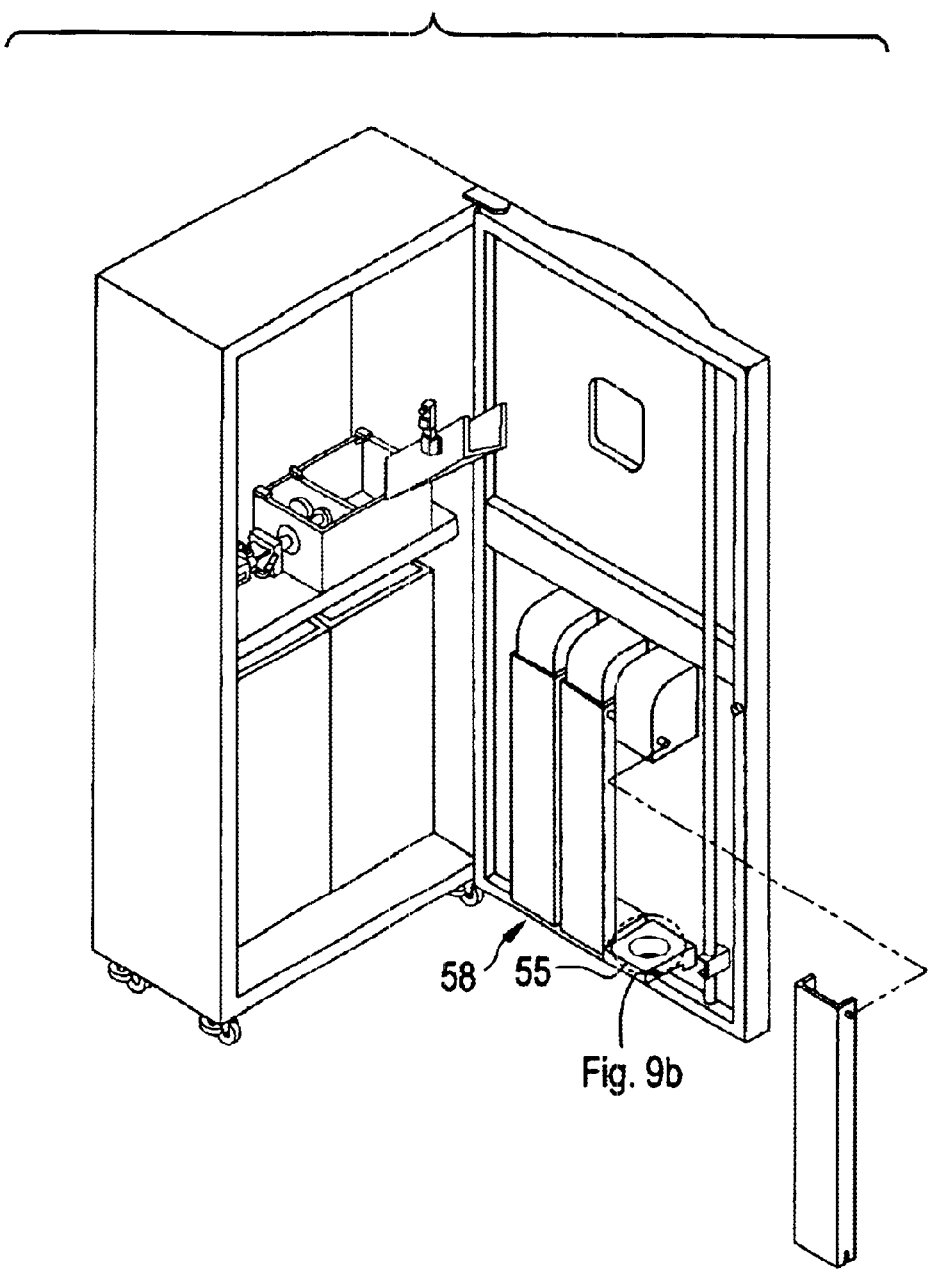
Figure 9B:
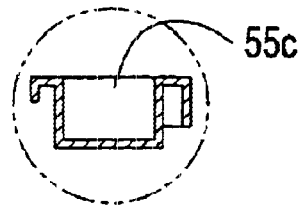

FIGS. 9a and 9b illustrate a paper cup collecting unit according to another embodiment of the present invention in the can crushing and sorting apparatus of FIG. 7a.

In accordance with this embodiment, as shown in FIG. 9, the support plate 55 of each paper cup stacker 58 has a downward-formed recess 55a.

In accordance with this configuration, when paper cups are stacked on the support plate 55, the residual liquid contents of those paper cups are received into the recess 55a. Accordingly, it is possible to sanitarily collect waste paper cups.

Figure 10:
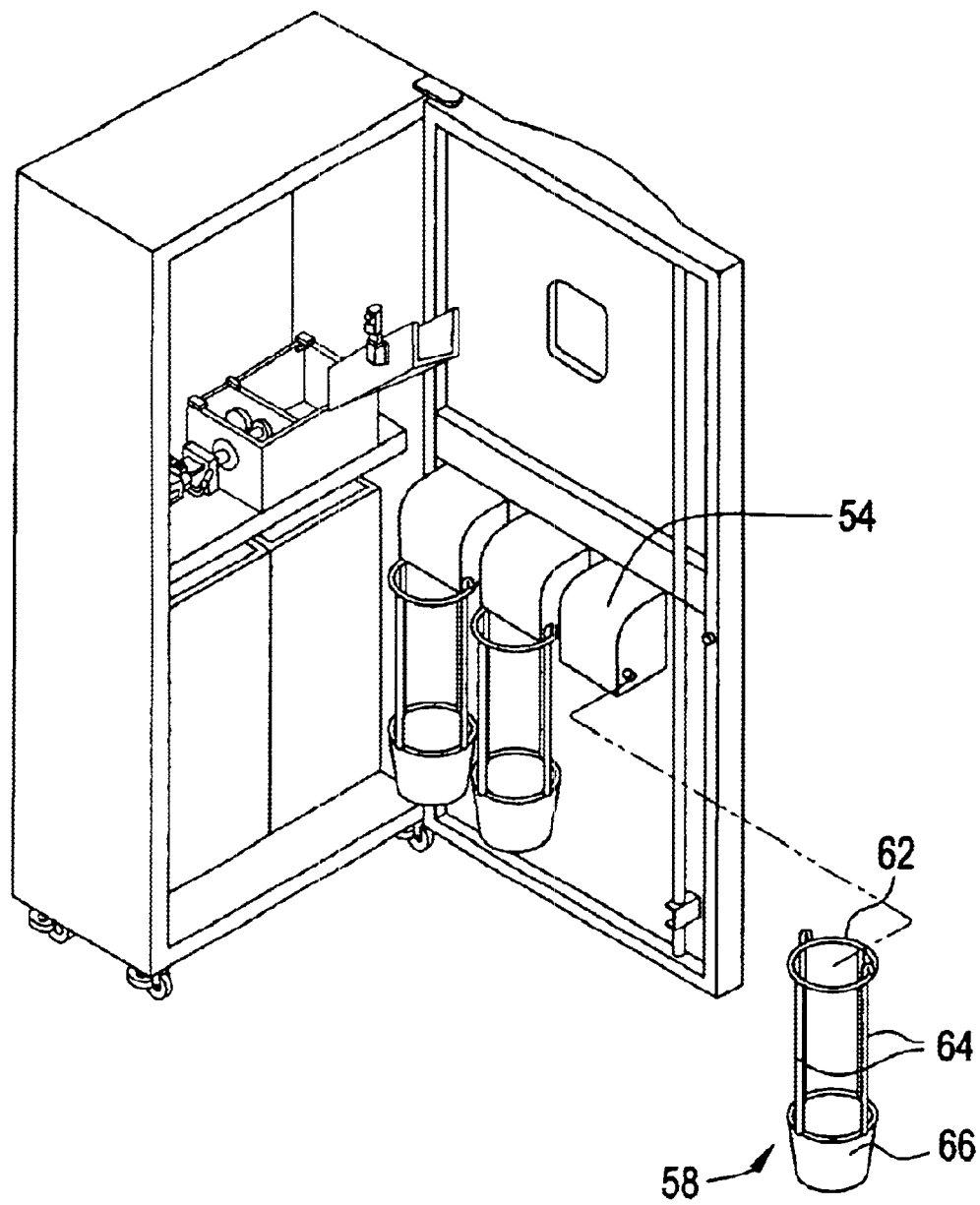

FIG. 10 is a perspective view illustrating a paper cup collecting unit according to another embodiment of the present invention in the can crushing and sorting apparatus of FIG. 7a.

In accordance with this embodiment, as shown in FIG. 10, each paper cup stacker 58 includes a support ring 62, a plurality of guide rods 64 fixed at the upper ends thereof to the support ring 62 while being uniformly spaced apart from one another in a circumferential direction, and a cup receiving member 66 mounted to the lower ends of the guide rods 64, and adapted to receive paper cups to be stacked. The paper cup stacker 58 is detachably coupled to the associated guide member 54.

The detachable coupling of each paper cup stacker 58 to the associated guide member 54 may be achieved using a well-known coupling means. For example, the coupling means may comprise engagement protrusions provided at the guide member 54, and hooks adapted to be engagable with the engagement protrusions. The hooks may be formed at respective upper ends of two guide rods arranged at opposite sides of the paper cup stacker 58 so that they are integral with the guide rods. Alternatively, separate hooks may be formed at the support ring 62.

In accordance with this embodiment, the paper cup stacker has a simple construction as compared to those of the above described embodiments. In particular, when waste paper cups introduced into the guide member through the cup receiving hole are stacked on the cup receiving member via the guide rods, they can be conveniently removed by simply separating the paper cup stacker from the guide member. Thus, it is possible to conveniently collect waste paper cups.

As apparent from the above description, the present invention provides a method and apparatus for crushing and sorting cans which can rapidly and conveniently achieve the process involving crushing, sorting and discharge of cans, by use of a simple construction and a minimum number of processing steps. Accordingly, it is possible to considerably reduce the manufacturing costs by virtue of the simple construction, and to collect an increased amount of crushed cans within a reduced time.

In accordance with the present invention, the driving of a crushing plate is achieved using a gear type driving system operatively connected to a DC motor. Accordingly, it is possible to reduce the manufacturing costs by 80% or more compared to the case using a hydraulic driving system. In this case, a reduction in weight can also be achieved, so that the can crushing and sorting apparatus has a lightest possible construction. As a result, it is possible to provide an inexpensive, light, and easily-installable can crushing and sorting apparatus.

In accordance with the present invention, it is possible to simply, easily and conveniently punch cans containing flammable or explosive gas, prior to the crushing of those cans, thereby improving safety during crushing and sorting operations.

It is also possible to easily achieve the replacement of the punching pin abraded due to repeated punching operations. Furthermore, a punching lever having a foldable structure may be used to allow the user to easily use the punching lever. In accordance with the present invention, the punching lever can be semi-permanently used because the replacement of the abraded punching pin can be easily achieved. In the case using the foldable punching lever, it is possible to minimize an obstruction to the user caused by the punching lever.

In accordance with the present invention, it is possible to not only easily achieve the crushing, sorting and collecting processes for cans, but also the simple and convenient collecting of waste paper cups by putting and stacking those cups into a paper cup collecting unit. Accordingly, the collection rate of waste paper cups is increased, thereby minimizing economic loss.

In accordance with the present invention, the amount of paper cups stacked in the paper cup collecting unit can be conveniently checked. Accordingly, the best time for collection of stacked paper cups can be conveniently determined.

In accordance with the present invention, it is possible to prevent the residual liquid contents of paper cups staked for the collection thereof from leaking externally. Accordingly, it is possible to sanitarily collect waste paper cups.

In accordance with the present invention, paper cup stackers having a simple and detachable structure are provide. Accordingly, the collection of stacked paper cups can be efficiently and conveniently achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A can crushing and sorting apparatus comprising:
   a case including a door and a case body,
   a can supply unit installed on a support frame with the case body, the can supply unit including a can supply container including an opening/closing plate driven to be opened and closed by a drive motor, and a proximity switch mounted on a lower surface of the can supply container,
   a crushing and sorting unit for crushing and sorting cans supplied from the can supply unit, collecting containers arranged beneath the crushing and sorting unit, and
   a control of the units controlling each unit of the apparatus,
   wherein the crushing and sorting unit comprises:
      a frame fixedly mounted to the support frame of the can supply unit, and adapted to define a crushing chamber, the frame being opened at a top and bottom thereof;
      a driving unit supported by the frame, and including a hydraulic pump, a hydraulic motor, and a cylinder having a rod extending through the frame; and a crushing/sorting/discharging unit including sensor for sensing positions of a vertically-extending crushing plate, wherein the sensors are respectively mounted on an upper end of the frame at opposite lateral ends of the frame, the vertically-extending crushing plate mounted on a protruded end of the rod within an interior of the frame, and attached with electromagnets wherein the control unit activates and inactivates the electromagnets in response to one of the sensors, and a support plate extending horizontally from a lower end of the crushing plate to be integral with the crushing plate, the support plate having a discharge hole and being arranged to be orthogonal to the crushing plate.

2. The can crushing and sorting apparatus according to claim 1, wherein the discharge hole of the support plate has a width to allow the crushed can to be discharged downwardly from a region where the support plate contacts the crushing plate while being orthogonal to the crushing plate.

3. The can crushing and sorting apparatus according to claim 1, wherein the driving unit comprises:
   a guide rail arranged at one side of the frame, and connected to a shaft extending through the frame to be coupled to the crushing plate;
   a rack slidably mounted on the guide rail outside the frame; and
   a pinion coupled to a DC motor, and engaged with the rack to slide along the guide rail in accordance with a rotation of the pinion carried out by the DC motor.

4. The can crushing and sorting apparatus according to claim 1, further comprising:
   a punching unit including
      a punching box fitted in a fitting opening formed at an upper portion of the door near one side of the door while being fixedly mounted to the door,
      a shaft having ends rotatably mounted to opposite side walls of the punching box,
      a torsion spring coupled at one end to one side wall of the punching box and at another end thereof to the shaft, and
      a punching lever mounted at one end to the shaft, and including a downwardly-extending punching pin.

5. The can crushing and sorting apparatus according to claim 4, wherein the punching lever further includes
   a threaded hole for allowing the punching pin to be threadedly coupled to the punching lever, while having a foldable structure having two lever portions pivotably coupled to each other, and
   a support member integrally formed with one of the lever portions, and adapted to support the other lever portion.

6. The can crushing and sorting apparatus according to claim 1, further comprising:
   a plurality of cup receiving holes formed at a lower portion of the door; and
   a paper cup collecting unit including:
      guide members mounted on a back surface of the door to communicate with each of the cup receiving holes, and adapted to downwardly guide paper cups introduced into the cup receive holes, and
      paper cup stackers mounted on the back surface of the door, and connected to each of the guide members, in order to stack the paper cups introduced into the cup receiving holes, each of the paper cup stackers including a support plate adapted to support the paper cups introduced along an associated one of the guide members in a stacked state, and a guide plate arranged between the support plate and the associated guide member while being detachably mounted on the support plate and the associated guide member, the guide plate being adapted to guide the introduced paper cups in order to stably stack the paper cups on the support plate.

7. The can crushing and sorting apparatus according to claim 6, further comprising:
   a stacked cup amount display unit having viewing slots each formed at the door, and adapted to allow a user to view the amount of paper cups stacked in one of the paper cup stackers.

8. The can crushing and sorting apparatus according to claim 6, wherein the support plate comprises a downwardly-formed recess.

9. The can crushing and sorting apparatus according to claim 1, further comprising:
- a plurality of cup receiving holes formed at a lower portion of the door; and
- a paper cup collecting unit including:
  - guide members mounted on a back surface of the door to communicate with each of the cup receiving holes, and adapted to downwardly guide paper cups introduced into the cup receive holes, and
  - paper cup stackers mounted on a back surface of the door, and connected to each of the guide members, in order to stack the paper cups introduced into the cup receiving holes, each of the paper cup stackers including a support ring, a plurality of guide rods fixed at upper ends thereof to the support ring while being uniformly spaced apart from one another in a circumferential direction, and a cup receiving member mounted on lower ends of the guide rods, and adapted to receive paper cups to be stacked, so that the paper cup stacker is detachably coupled to one of the guide members.

* * * * *